United States Patent
Hollis et al.

(10) Patent No.: US 7,591,476 B2
(45) Date of Patent: Sep. 22, 2009

(54) FIFTH WHEEL KING PIN RELEASE MECHANISM HAVING ADDITIONAL FUNCTIONS

(76) Inventors: William E. Hollis, 215 Hillendale Rd., Pittsburgh, PA (US) 15237; William E. Hollis, Jr., 109 Wescott Dr., Pittsburgh, PA (US) 15237; Edward J. Boyd, 275 Springvalley Rd., Saxonburg, PA (US) 16056

( * ) Notice: Subject to any disclaimer, the term of this patent is extended or adjusted under 35 U.S.C. 154(b) by 43 days.

(21) Appl. No.: 10/982,214

(22) Filed: Nov. 5, 2004

(65) Prior Publication Data

US 2006/0097479 A1    May 11, 2006

(51) Int. Cl.
*B62D 53/06* (2006.01)

(52) U.S. Cl. ..................................... 280/434

(58) Field of Classification Search ............... 280/433, 280/434, 441, 441.1, 436; 254/129; 16/427
See application file for complete search history.

(56) References Cited

U.S. PATENT DOCUMENTS

| | | | | |
|---|---|---|---|---|
| 4,114,471 A | * | 9/1978 | White | 74/551.6 |
| 4,871,182 A | * | 10/1989 | Altherr et al. | 280/434 |
| 5,282,554 A | * | 2/1994 | Thomas | 224/421 |
| 5,378,007 A | * | 1/1995 | Joyce | 280/433 |
| 5,423,567 A | * | 6/1995 | Upton | 280/433 |
| 5,472,223 A | * | 12/1995 | Hawthorne et al. | 280/437 |
| 5,516,138 A | * | 5/1996 | Fontaine | 280/434 |
| 5,641,174 A | * | 6/1997 | Terry et al. | 280/434 |
| 5,863,060 A | * | 1/1999 | Hollis et al. | 280/433 |
| 5,988,666 A | * | 11/1999 | Flater | 280/434 |
| 6,095,544 A | * | 8/2000 | Flater | 280/434 |
| 6,201,252 B1 | * | 3/2001 | Hollis et al. | 250/433 |
| 6,935,664 B2 | * | 8/2005 | McGrew et al. | 294/26 |
| 2007/0182126 A1 | * | 8/2007 | Anderson | 280/441 |

* cited by examiner

*Primary Examiner*—Tony H. Winner
(74) *Attorney, Agent, or Firm*—James Ray & Assoc.

(57) ABSTRACT

A manual release mechanism for disengaging a king pin on a truck trailer from a fifth wheel of a truck cab includes a substantially straight lever arm with a first end being pivotally attached to the fifth wheel and a second end being spaced away from the fifth wheel extending horizontally from the first end. A pair of flat disks and a pair of slide bars are provided for slideably coupling to a release rod of the fifth wheel, such that a manual movement of the second end of the lever arm will cause pivoting thereof horizontally about the first end, thereby causing the release rod to be pulled outwardly to disengage the king pin from the fifth wheel. The lever arm is provided with an adjustable extension arm so that the length of the lever arm can be adjusted to an extent desired to best facilitate manipulation thereof. A lock pin is provided for securing the extension arm to the lever arm. A flexible cable secures the extension arm to the frame of the truck cab.

9 Claims, 2 Drawing Sheets

FIFTH WHEEL KING PIN RELEASE MECHANISM HAVING ADDITIONAL FUNCTIONS

CROSS-REFERENCE TO RELATED APPLICATIONS

This application is related to U.S. Pat. No. 6,201,252 and to U.S. Pat. No. 5,863,060, both titled "Fifth Wheel King Pin Release Mechanism" and owned by the same applicants. The teachings of U.S. Pat. Nos. 6,201,252 and 5,863,060 are incorporated into this document by reference thereto.

FIELD OF THE INVENTION

This invention relates generally to articulated semi-trailer trucks and the interconnection between the cab and trailer, more particularly, this invention relates to an improved lever mechanism intended to be permanently mounted to the fifth wheel of a truck cab for quickly and easily disconnecting the king pin on the truck trailer from the fifth wheel on the truck cab in a relatively safe manner and, even more specifically, the instant invention relates to an improvement over the mechanism disclosed in the above-identified related U.S. patents in being economically advantageous and performing various other functions required during operation of articulated semi-trailer trucks.

BACKGROUND OF THE INVENTION

The following background information is provided to assist the reader in understanding the environment in which the invention will typically be used. The terms used herein are not intended to be limited to any particular narrow interpretation unless stated otherwise in this document.

Semi-trailer trucks are well known throughout the world in which an independent truck trailer can interchangeably be connected to practically any desired truck cab for transporting the trailer and its contents to any desired location.

While the truck cab and truck trailer can take any one of a large variety of different forms and sizes, depending on the intended use and intended load to be transported, the interconnection between the cab and trailer has developed into a uniform standard design so that the cabs and trailer can readily be interchanged according to need. Pursuant to this standard form, the truck cab is normally provided with a chassis structure such that a portion of the truck frame extends rearwardly of the cab with one or more drive axles, upon which wheel and tires are mounted, supporting the truck cab on the road surface under the rearwardly extending portion of the frame structure.

A tiltable, steel disk, commonly referred to as the "fifth wheel", is horizontally disposed on the upper side of the rearwardly extending frame portion, with the fifth wheel having a diverging "V" slot extending rearwardly from an aperture at the axial center.

Related U.S. Pat. Nos. 6,201,252 and 5,863,060 teach a new and improved mechanism intended to be permanently mounted to the fifth wheel of a truck cab and connected to a release rod thereof for quickly and easily disconnecting a trailer king pin from the fifth wheel of the truck cab.

Namely, the improvement includes an adjustable lever mechanism rigidly and pivotally mounted to the fifth wheel at the first end. The first end is sufficiently curved or bent so it can generally fit closely to a cylindrical side surface of the fifth wheel. The first end of the lever arm is pivotally connected to a mounting bracket that is rigidly attached to the side of the fifth wheel. A slide coupling disposed parallel to the lever arm enables an attachment thereof to the release rod so that the point of attachment moves when the lever is pivoted, thereby permitting the release rod to be pulled straight outward from the fifth wheel without any tendency for bending.

A telescopically adjustable extension arm enables the operator to adjust the length of the lever arm to be appropriate for what is needed to permit him to operate the mechanism without difficulty.

Installation of the mechanism taught by the related U.S. Pat. Nos. 6,201,252 and 5,863,060 requires that a length of a portion of the release rod outwardly extending from the fifth wheel must be maintained within a predetermined range in order to eliminate bending of the release rod during operation. However, it has been found that truck operators modified such original release rods to increase the length of the extended portion in a variety of configurations resulting in such predetermined length exceeding the installation requirements. During such modifications, the eyelet termination of the original release rod was also modified causing difficulties of attaching the mechanism to the release rod.

As the result, the mechanism taught by the related U.S. Pat. Nos. 6,201,252 and 5,863,060 was being improperly installed and while it improved ease of disconnecting a trailer king pin from the fifth wheel of the truck cab it did not prevent bending of the release rod.

Therefore, there is a need to provide an improved fifth wheel king pin release mechanism capable of accommodating various field modifications of the original release rod of the fifth wheel.

It also has been found that, occasionally, the king pin would slide over the fifth wheel during coupling of the cab to the trailer and get lodged outside of the fifth wheel necessitating manual leveling of the fifth wheel in order to move the truck cab forward and repeat coupling with the trailer. Such manual leveling of the fifth wheel typically requires the truck operator to seek help from another person to place a wedge between the fifth wheel and the bottom surface of the trailer body.

It has been additionally observed that truck operators used numerous tools to perform other functions related to operating an articulated semi-trailer truck, such as: determining the amount of fuel in the fuel tank or the amount of air in the tires, straightening nails and screws imbedded in the tires for ease of removal, repositioning airline cable and glad hands, balancing the weight on the truck axles, removing loose stones and debris lodged between the tires and pulling down the tarp straps.

SUMMARY OF THE INVENTION

The present invention teaches a manual release mechanism for disengaging a king pin on a truck trailer from a fifth wheel of a truck cab, such fifth wheel having an elongated release rod extending generally horizontally outwardly through an opening in a side wall of such fifth wheel adapted to be pulled outwardly to disengage such king pin from such fifth wheel. The manual release mechanism includes a substantially straight lever arm of a predetermined length with a first end disposed adjacent the fifth wheel and a second end which is adapted to be spaced away from such fifth wheel extending generally horizontally from the first end. The first end is pivotally attached to a pivot link having a first portion with at least one first aperture for rigid attachment to such fifth wheel at a location spaced from such opening through which such release rod extends and a second portion outwardly extending from one end of the first portion and having at least one second aperture for pivotal attachment to the second end of the lever arm. A pair of slide bars rigidly attached to the lever arm and a pair of flat disks abutting the lever arm and the pair of slide bars is provided for slideable attachment of the lever arm to an end of the release rod. In such arrangement, a manual movement of the second end of the lever arm will cause the lever arm to be pivoted generally horizontally about the first end and cause such release rod to be pulled outwardly from such fifth wheel sufficient to disengage such king pin from such fifth wheel. An extension arm is telescopically inserted into the second end of the lever arm to be selectively positioned for extending the predetermined length of the lever arm. The extension arm is adapted with a predetermined plurality of aligned apertures disposed in a predetermined pattern intermediate the first and second ends thereof for selectively extending the predetermined length of the release arm. A lock pin is inserted into aligned apertures through the lever arm and the extension arm for locking the extension arm in one of an extended and a non-extended position. A hand grip is disposed at the second end of the extension arm for grasping thereof for disengaging such king pin from such fifth wheel. A flexible cable is attached to the extension arm adjacent the hand grip at one end and is attached to the frame of such truck cab at a second end for preventing the extension arm from being stolen, lost or misplaced. Manual downward movement of the hand grip will level the fifth wheel enabling release of the king pin which jumped the fifth wheel and became lodged external of the fifth wheel in a direction of the truck cab. The generally open first end of the extension arm enables straightening of nails and screws imbedded in the tires for ease of removal or break loose stones, wood or other debris lodged between the tire tandems. The extension arm may be used to strike the tires in order to determine that air is contained within such tires by monitoring the tire reaction and springback after striking. The extension arm may be further used to balance a weight of the trailer on front or rear axles of the truck cab by reaching in and pulling on the trailer bar pin disposed between the tandem wheel arrangements.

OBJECTS OF THE INVENTION

Accordingly, it is a primary object of this invention to provide an improved release mechanism for quickly and easily disengaging the king pin of a truck trailer from the truck cab's fifth wheel in a relatively safe manner.

Another object of this invention is to provide an improved release mechanism for quickly and easily disengaging the king pin of a truck trailer from the truck cab's fifth wheel which is permanently attached to the fifth wheel and thereby eliminates the need to repeatedly engage a release tool onto the release rod end each time a release is desired, and which cannot, therefore, be lost, stolen or misplaced in its entirety.

A further object of this invention is to provide an improved release mechanism for quickly and easily disengaging the king pin of a truck trailer from a truck cab's fifth wheel which eliminates bending of the modified release rod.

Yet a further object of this invention is to provide an improved release mechanism for quickly and easily disengaging the king pin of a truck trailer from a truck cab's fifth wheel which enables visual identification of an engagement status of the king pin.

An additional object of this invention is to provide an improved release mechanism for quickly and easily disengaging the king pin of a truck trailer from a truck cab's fifth wheel which can be used for performing various other functions of the articulated semi-trailer truck operation.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
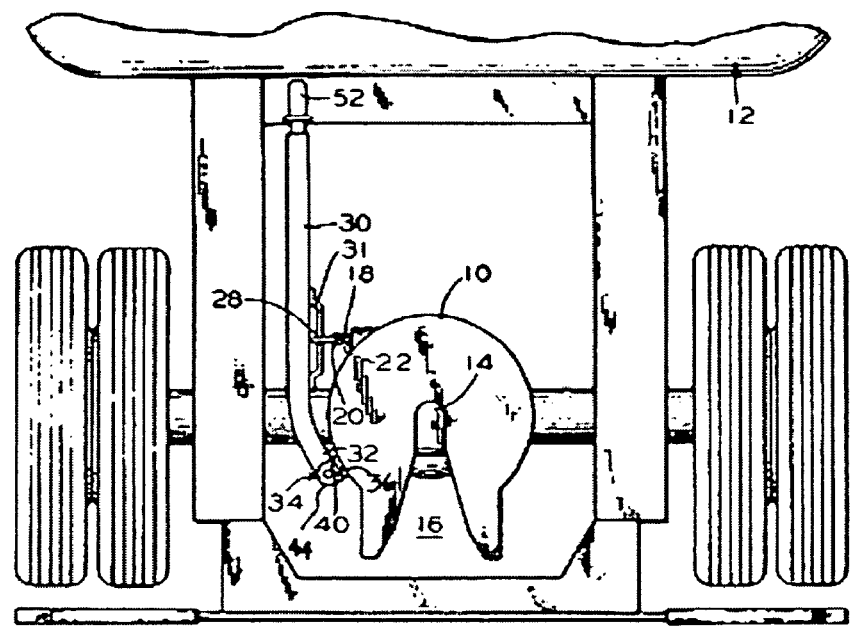
FIG. 1 is a plan view of a prior art fifth wheel king pin release mechanism installed onto a fifth wheel of a truck cab.
Figure 3:
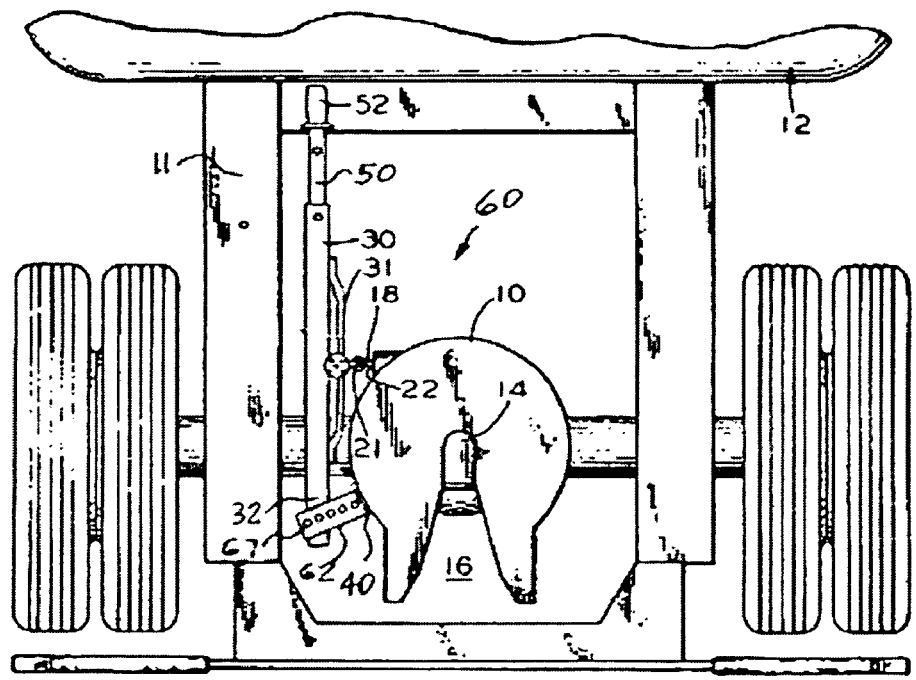
FIG. 3 is a plan view of a fifth wheel king pin release mechanism of the present invention installed onto the fifth wheel of the truck cab.

DESCRIPTION OF THE PRESENTLY PREFERRED AND VARIOUS ALTERNATIVE EMBODIMENTS OF THE INVENTION

Before describing the invention in detail, the reader is advised that, for the sake of clarity and understanding, identical components having identical functions have been marked where possible with the same reference numerals in each of the Figures provided in this document.

Fifth wheel king pin release mechanism of the prior art is best shown in FIG. 1. As can be seen, the fifth wheel 10, mounted over the rear tires of truck cab 12, is provided with an aperture 14 at the axial center with a diverging "V" slot 16 extending rearwardly from the aperture 14. A release rod 18, having an eyelet 20 at its outer end, extends through aperture 22 in the left-hand side of the vertical side wall of the fifth wheel 10.

A lever arm 30 having a rigid, elongated lever, such as a length of tubular steel, having a first end 32 pivotally attachable to a side of fifth wheel 10 at a location spaced from the aperture 22 having the release rod 18 extending therethrough. A bolt 40 is employed for rigidly holding pivot link 34 against the side of fifth wheel 10. The portion of the lever arm 30 positioned between the pivot link 34 and the release rod 18 is sufficiently curved or bent so that it can generally fit rather closely to the cylindrical side surface of fifth wheel 10.

Means, such as a connecting loop 28 at the end of release rod 18, is provided for the purpose of attaching the release rod 18 to the lever arm 30, at a slide bar 31. The pivot link 34 is adapted with a vertical flange 36 for attachment to such fifth wheel 10 with a fastener 40 and at least one horizontal flange 44 for attachment to the first end 32 of the lever arm 30.

An extension arm 50 telescopically insertable into the outer end of lever arm 30 is adapted to lengthen lever arm 30, which of course, provides added leverage, but more importantly provides more room for the operator to manipulate the lever arm 30 without being confined within the narrow area between the bottom of the trailer and the rear tires on the truck cab, and most importantly without the hazards posed by an elongated lever arm 30 as noted above.

A hand grip 52 is provided at the outer end of the extension arm 50 to facilitate manipulation of the lever arm 30, and can also serve as a stop means to limit the extent to which extension arm 50 can be inserted into the second end 33 of the lever arm 30 to fix the shortest possible length thereof.

Figures 2A, 2B, 2C, 2D, 2E, 2F:
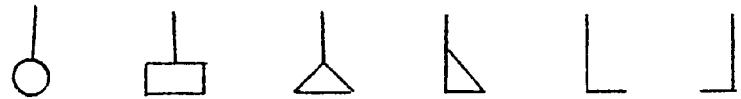
FIG. 2a-2f are a plan view of the various modifications of an end of the release rod of the fifth wheel.
Figure 4:
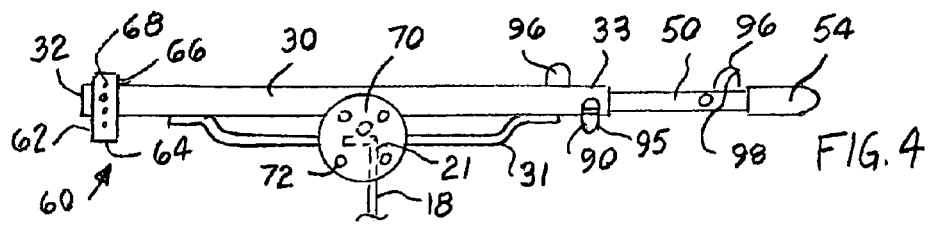
FIG. 4 is a plan view of the fifth wheel king pin release mechanism of the preferred embodiment of the present invention.

Various configurations of a modified end 21 of the release rod 18 are shown in FIGS. 2a-2f and range from a fully closed eyelet end 21, best shown in FIG. 2a, to an open L-shaped end 21, best shown in FIGS. 2e and 2f. It will be understood that a connecting loop 28 taught by related U.S. Pat. No. 5,863,060 would not be sufficient to attach the prior art fifth wheel king pin release mechanism to the open L-shaped end 21 in FIGS. 2e and 2f.

A fifth wheel king pin release mechanism of the present invention, generally designated 60, is illustrated in FIGS. 3-9. Such fifth wheel king pin release mechanism 60 includes a substantially straight lever arm 30 having a first end 32 for attachment to the fifth wheel 10 and having a second end 33 extending generally horizontally from the first end 32 toward the truck cab 12 where it can be easily seen and grasped. It will be appreciated that such substantially straight configuration of the lever arm 30 reduces manufacturing costs associated with forming the curved portion of the prior art lever arm 30.

To maintain ease of operating the lever arm 30 during release of the king pin (not shown), the first end 32 has a pivot link 62 with a first flange 64 having at least one first aperture 65 for attachment to the fifth wheel 10 with a fastener 40. Pivot link 62 further includes a second flange 66 having at least one second aperture 68 disposed therein for attachment to the first end 32. Preferably, the pivot link 62 has a pair of second flanges 66 extending parallel from each end of the first flange 64 and forming a generally open end 67.

It is further preferred that such pair of second flanges 66 is provided with a predetermined plurality of mating and opposed second apertures 68 disposed therein for selectively determining the optimum pivoting of the lever arm 30 during operation.

Figure 5:
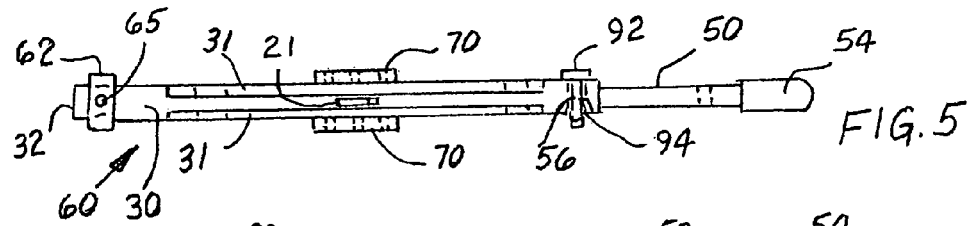
FIG. 5 is an elevation view of the fifth wheel king pin release mechanism of the present invention as shown in FIG. 4.
Figure 6:
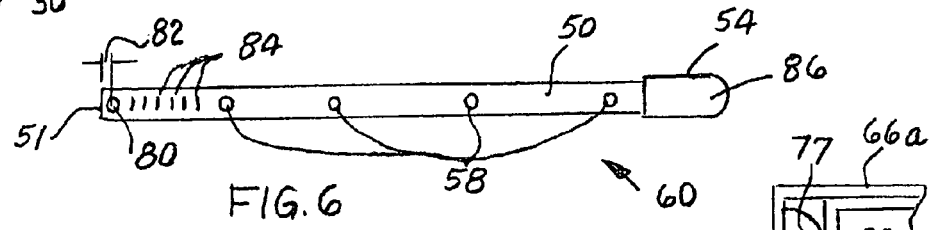
FIG. 6 is a plan view of the fifth wheel king pin release mechanism of the present invention, particularly showing an extension arm of the present invention.

Means 70 engaging the lever arm 30 are provided for slideably coupling the end 21 of the release rod 18. In the preferred embodiment, such means 70 comprise a pair of slide bars 31 rigidly attached to opposite edges of the lever arm 30 in combination with a pair of disks 70 abutting the slide bars 31 and the lever arm 30 for capturing the end 21 of the release rod 18 disposed intermediate such slide bars 31, as best shown in FIG. 5.

Preferably, such disks 70 are generally flat and round. Each disk 70 has at least one aperture 72 for securing the end 21 with any one of well known fastening means 74 including but not limited to fasteners, ties, cables or wires. Preferably, such at least one aperture 72 is a predetermined plurality of apertures 72 disposed in a predetermined pattern within each disk 70. Those skilled in the art will readily understand that combination of slide bars 31 and disks 70 will enable vertical movement of the release rod 18 and will enable attachment of the lever arm 30 to various configurations of the end 21 of the release rod 18. For example, only a single pair of mating apertures 72 may be utilized when the end 21 is of a closed type in FIGS. 2a-2d. A predetermined plurality of pairs of mating apertures 72 will be utilized when the end 21 of the release rod 18 is of an open L-shaped type in FIGS. 2e-2f.

Figure 7:
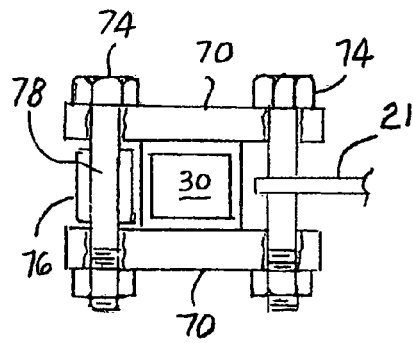
FIG. 7 is a partial end view of the fifth wheel king pin release mechanism of the present invention, particularly showing a first alternative embodiment of slideably coupling the release arm to the release rod.

Alternatively, such means 70 may comprise a single pair of flat disks 70 abutting the opposed surfaces of the lever arm 30 and being attached therebetween with at least a pair of fastening means 74, which preferably is at least a pair of threaded fasteners 74 as best shown in FIG. 7. A means 76 engaging the lever arm 30 may be disposed opposite the end 21 for guiding disks 70 and the end 21 during operation of the lever arm 30. Advantageously, such means 76 may be a tubular member 76 having an internal aperture 78 for rotatable engagement with a threaded fastener 74. Such arrangement enables rotatable movement of the means 76 about the lever arm 30 during operation thereof.

Figure 8:
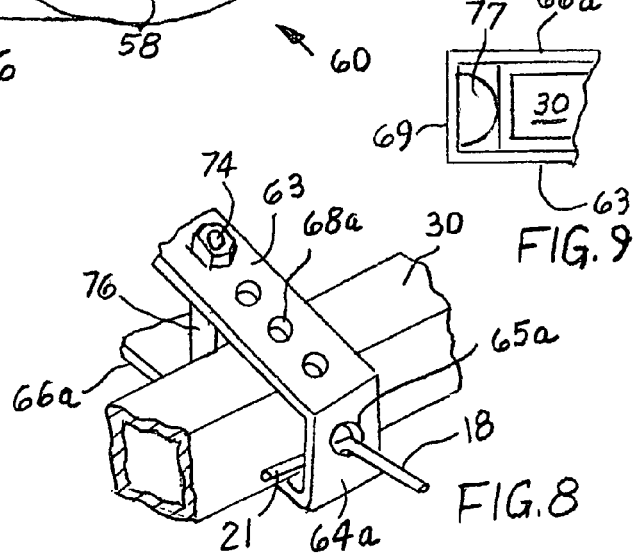
FIG. 8 is a partial perspective view of the fifth wheel king pin release mechanism of the present invention particularly showing a second alternative slideably coupling the release arm to the release rod.

Alternatively, means 70 may utilize a second pivot link 63 for slideably coupling the lever arm 30 to release rod 18 instead of disks 70, as best seen in FIG. 8. The second pivot link is preferably identical to the pivot link 62 and includes a first flange 64a and a pair of second flanges 66a each having a plurality of apertures 68a formed therethorough. The at least one aperture 65a formed through the first flange 64a is advantageous for attachment to open end 21 of the release rod 18.

Figure 9:
FIG. 9 is a partial end view of the fifth wheel king pin release mechanism of the present invention particularly showing a guiding means of the slideably coupling of the release arm to the release rod.

As best shown in FIG. 9, the second open end 67a of the second pivot link 63 may be substantially closed by means of a third flange 69 which may be equipped with a guiding means 77 attached thereto and manufactured from a polymer material having a low frictional coefficient. It will be appreciated that such closed second link 63 may be manufactured from rectangular tubular stock for the sake of cost.

In the present invention, the slide bars 31 have been lengthened as compared with the slide bar 31 of the prior art to accommodate, in combination with the selected pivot placement within the pivot link 62, various lengths of the exposed portion of the release rod 18. Thus, a longer extended portion of the release rod 18 will cause the pivot placement further from the fifth wheel 10 and will cause a greater sliding distance of the release rod 18 with respect to the lever arm 30, while a shorter extended portion of the release rod 18 will cause the pivot placement near the fifth wheel 10.

For reasons explained below, extension arm 50 of the present invention includes an additional pair of mating apertures 80 of a predetermined size being disposed in a close proximity to a first open end 51 of the extension arm 50. Preferably, edges of such pair of apertures 80 are disposed at a predetermined distance 82 from the first edge 51 wherein such predetermined distance 82 is less than the predetermined size of the aperture 80. Preferably, such mating apertures 80 are generally round. Alternatively, such mating apertures 80 may be of a non-round predetermined shape having a predetermined cross-section and being disposed in a predetermined orientation with respect to outer longitudinal edges of the lever arm 30.

A second end 53 disposed opposite from the first open end 51 may be used for grasping such extension arm 50 during operation. Preferably, such second end 53 includes a hand grip means 54 being manufactured from a material including but not limited to metal, wood, plastic or rubber. Alternatively, the second end 53 may be provided as a closed end 53 to facilitate grasping and protect interior portion of such extension arm 50 from penetration by environmental factors.

The extension arm 50 may be provided with a predetermined plurality of equally spaced markers 84 disposed intermediate the first and second edges 51 and 53 respectively for determining the amount of fuel in the fuel tank of the truck cab 12 which is not shown but well known in the art. Alternatively, the amount of fuel may be determined by such plurality of apertures 58 and 80 after first determining the overall depth of the fuel tank (not shown) in respect to the plurality of such apertures 58 and 80.

The fifth wheel king pin release mechanism 60 may be adapted with an indication means 86 which is easily recognizable from a distance. Such indication means 86 may be a color of the hand grip means 54 which differs from the color of the lever arm 30 and the extension arm 50 or a decal applied to the hand grip means 54, the lever arm 30 or the extension arm 50. Preferably, the indication means 86 is a reflective type for ease of identification during darkness or nightfall with the use of a flashlight.

A means 90 for selectively locking an extension arm 50 at either an extended or non-extended position is insertable into aligned apertures 56 and 58 and may be a lock pin or a fastener. Preferably, such means 90 is a lock pin 90 comprising a first portion 92 abutting the surface of the lever arm 30, a stem portion 94 of a second predetermined cross-section extending from the first portion 92 through the mating apertures 56, 58 and 80 in the lever arm 30 and the extension arm 50 and a locking portion 95 rigidly attached to either the first portion 92 or the stem portion 94 at one end and detachably attachable to the stem portion 94 at an open end thereof extending past an opposite surface of the lever arm 30. Preferably, such locking portion 95 is at least semi-rigid. Preferably, the second predetermined cross-section of the stem portion 94 is slightly smaller than the first predetermined cross-section of the pair of mating apertures 80 enabling a predetermined orientation of the means 90.

To prevent the extension arm 50 from being lost, stolen or misplaced, the fifth wheel kin pin release mechanism 60 may include a means 98 for securing extension arm 50 to the frame 11 of the truck cab 12. In the preferred embodiment, such means 98 is a flexible cable 98 attachable to the truck frame 11 at one end and either to a loop 96 of the extension arm 50 or to the aperture 58.

Alternatively, the lever arm 30 may include a second loop 96 disposed adjacent the second end 33 for securing extension arm 50 to the lever arm 30 which is permanently attached to the release rod 18 and to the fifth wheel 10. It will be appreciated that such means 98 may be a well known chain, wire, cord or rope.

In operation, the extension arm 50 is selectively extended to enable ease grasping and to provide optimum pulling leverage. The means 90 is then employed to positively secure the extension arm 50 to the lever arm 30 by insertion of means 90 into aligned apertures 56 and 58 or 82.

To enable coupling of the truck cab 12 with the trailer (not shown), the fifth wheel king pin release mechanism 60 is pulled outwardly and away from the fifth wheel 10 enabling the king pin (not shown) to engage the aperture 14. Upon such engagement, the release rod 18 moves toward the fifth wheel 10 by a spring back action within the fifth wheel 10 causing the inward movement of the lever arm 30 and the extension arm 50.

The driver can observe the position of the hand grip 54 during coupling to determine if the king pin (not shown) is secured within the aperture 14. The hand grip means 54 easily viewable from the cab 12 will signal to the driver that the fifth wheel king pin release mechanism 60 is in a disengaged position and, more importantly, that the king pin (not shown) has not been secured within the aperture 14.

In a situation, when the king pin (not shown) jumps the aperture 14 and the fifth wheel 10 and is lodged external of the fifth wheel 10 in a direction of the truck cab 12, the driver can level the fifth wheel 10 by applying pressure on the hand grip 54 in a downward direction and by using at least a portion of the cable 98 to secure the fifth wheel 10 in such leveled position. The driver can then move the truck cab 12 forward, release the fifth wheel 10 and repeat the coupling process.

The open end 51 of the extension arm 50 enables straightening of nails and screws imbedded in the tires for ease of removal or break loose stones, wood or other debris lodged between the tire tandems.

The extension arm 50 may be used to strike the tires in order to determine that air is contained within such tires by monitoring the tire reaction and spring back after striking.

The extension arm 50 may be used to balance the weight on front or rear axles of truck cab 12 by reaching in and pulling on the trailer bar pin disposed between the tandem wheel arrangements.

It will be appreciated that the first and second predetermined cross-sections of the pair of apertures 80 and the stem portion 94 respectively enable the locking portion 95 of the means 90 to be disposed in such predetermined orientation to the longitudinal edges of the extension arm 50. Preferably, such predetermined orientation is perpendicular to the longitudinal edges of the extension arm 50 enabling utilization of such locking portion 95 for pulling tarp straps or rearranging airline cables and hand glands.

Those skilled in the art will readily understand that the fifth wheel king pin release mechanism 60 of the embodiments discussed supra enables ease of interchanging truck cabs 12 and trailers (not shown), particularly containing the fifth wheel 10 with modified release rod 18.

In applications mandating a standardized truck cab 12 and trailer (not shown) combination and not requiring such fifth wheel king pin release mechanism 60 to perform all additional functions, the lever arm 30 may be adapted with a predetermined length optimizing ease of disconnecting a trailer king pin (not shown) from the fifth wheel 10 of the truck cab 12.

Such applications enable elimination of the extension arm 50 and, more particularly, enable further reduction of manufacturing costs associated with such extension arm 50 and its attachment provisions disposed within the lever arm 30 and eliminate such extension arm 50 from being lost, stolen or misplaced.

In such applications, the hand grip means 54 may be attached to the second end 33 of the lever arm 30 or, alternatively, the second end 33 may be provided as a closed end 33 to facilitate hand grip and protect interior portion of such lever arm 30 from penetration by environmental factors. Furthermore, the first end 32 of the lever arm 30 may be bent at a predetermined angle and adapted for permanent and pivotable attachment to the fifth wheel 10 for disposition within the confines of the truck cab frame 11 when the king pin (not shown) is retained by the fifth wheel 10 in a locked condition.

While the presently preferred embodiment of the instant invention has been described in detail above in accordance with the patent statutes, it should be recognized that various other modifications and adaptations of the invention may be made by those persons who are skilled in the relevant art without departing from either the spirit of the invention or the scope of the appended claims.

We claim:

1. A manual release mechanism for attachment to a fifth wheel of a truck cab for disengaging a king pin on a truck trailer combination from such fifth wheel of a truck cab, such fifth wheel having an elongated release rod extending outwardly therefrom through an opening in a side wall of such fifth wheel and adapted to be pulled outwardly to disengage such king pin from such fifth wheel, said manual release mechanism comprising:
   a) a lever arm having a predetermined length, a first end pivotally attachable to such fifth wheel at a location spaced from such opening through which such release rod extends and a second end spaced away from such fifth wheel extending generally horizontally from said first end; and
   b) a means engageable with said lever arm intermediate said first end and said second end for slideably coupling said lever arm to such elongated release rod such that a manual movement of said second end of said lever arm will cause said lever arm to be pivoted generally horizontally about said first end to cause such release rod to be pulled outwardly from such fifth wheel sufficient to disengage such king pin from such fifth wheel, wherein said means for slideably coupling said lever arm to such elongated release rod includes a first member disposed generally horizontally and abutting said lever arm and a second member disposed generally horizontally and abutting said lever arm opposite said first member, said first and second members extending past a predetermined width of said lever arm, said first and second members include at least one pair of mating and opposed apertures for attachment of said first member to said second member and to an end of such release rod disposed intermediate said first and second members, said first and second members adapted for slidable movement along at least a portion of said lever arm sufficient to disengage such king pin from such fifth wheel.

2. A manual release mechanism, according to claim 1, wherein said first and second members are generally flat and generally round.

3. A manual release mechanism, according to claim 1, wherein said manual release mechanism includes a predetermined plurality of said pairs of said mating and opposed apertures disposed in a predetermined pattern.

4. A manual release mechanism, according to claim 1, wherein said means for slideably coupling said lever arm to such elongated release rod further including a first slider bar rigidly attached to a first longitudinal edge of said lever arm and abutting said first member and a second slider bar rigidly attached to an opposite longitudinal edge of said lever arm parallel to said first slider bar and abutting said second member, said first and second slider bars forming a gap for receiving said end of such release rod.

5. A manual release mechanism, according to claim 1, wherein said means for slideably coupling said lever arm to such elongated release rod further includes a guide means abutting said lever arm opposite said end of such release rod, said guide means pivotally attached to said first and second members.

6. A manual release mechanism, according to claim 1, wherein said manual release mechanism further includes a visual indication means disposed for ease of distant recognition of said manual release mechanism and a status thereof in one of an engaged position and a disengaged position.

7. A manual release mechanism, according to claim 6, wherein said visual indication means is a reflective tape for easy identification at night.

8. A manual release mechanism for attachment to a fifth wheel of a truck cab for disengaging a king pin on a truck trailer combination from such fifth wheel of a truck cab, such fifth wheel having an elongated release rod extending outwardly therefrom through an opening in a side wall of such fifth wheel and adapted to be pulled outwardly to disengage such king pin from such fifth wheel, said manual release mechanism comprising:
   a) a lever arm having a predetermined length, a first end pivotally attachable to such fifth wheel at a location spaced from such opening through which such release rod extends and a second end spaced away from such fifth wheel extending generally horizontally from said first end; and
   b) a means engageable with said lever arm intermediate said first end and said second end for slideably coupling said lever arm to such elongated release rod such that a manual movement of said second end of said lever arm will cause said lever arm to be pivoted generally horizontally about said first end to cause such release rod to be pulled outwardly from such fifth wheel sufficient to disengage such king pin from such fifth wheel, wherein said means for slideably coupling said lever arm to such elongated release rod includes a link having a first portion with at least one first aperture for connection to said end of such release rod, a second portion outwardly extending from one end of said first portion, a third portion extending from a second end of said first portion parallel to said second portion, said second and third portions forming an open end and including at least one pair of mating and opposed second apertures for attachment to said lever arm, and a forth portion substantially closing said open end of said link.

9. A manual release mechanism, according to claim 8, wherein said means for slideably coupling said lever arm to such elongated release rod further includes a guide means attached to said fourth portion, said guide means manufactured from a polymer material having a low friction coefficient.

* * * * *